United States Patent Office 3,082,195
Patented Mar. 19, 1963

3,082,195
POLYMERIZATION PROCESS
Edwin F. Peters, Lansing, and Bernard L. Evering, Chicago, Ill., assignors to Standard Oil Company, Chicago, Ill., a corporation of Indiana
No Drawing. Filed Oct. 22, 1959, Ser. No. 847,902
9 Claims. (Cl. 260—93.7)

This invention relates to an improved process for the preparation of normally solid polymers from charging stocks comprising essentially normally gaseous 1-alkenes in the presence of catalysts comprising essentially supported metal oxides of metals selected from groups 5a and 6a of the periodic table and certain compounds of aluminum.

In our U.S. patent applications Serial No. 493,073, now U.S. Patent 2,912,419 and Serial No. 504,684, now U.S. Patent 2,824,089, novel processes have been disclosed for the preparation of normally solid polymers of normally gaseous mono-olefins by polymerization thereof with heterogeneous catalysts in the presence of aluminum hydrocarbon compounds as co-catalysts. The heterogeneous catalysts of the disclosed processes comprise essentially group 5a and/or group 6a metal oxides supported upon inert solid supporting materials which are preferably difficultly reducible metal oxides such as alumina, magnesia, titania, zirconia, silica, or their composites, etc. The co-catalyst employed together with said supported oxide catalyst comprises essentially an aluminum hydrocarbon compound conforming to the general formula

wherein $R_1$, $R_2$, and $R_3$ are the same or different monovalent radicals selected from the class consisting of hydrogen and monovalent hydrocarbon radicals. The polymerization or copolymerization process is effected at suitable temperatures within the range of about 20° C. to about 230° C. and pressures suitably between atmospheric and 5000 p.s.i.g., although higher pressures up to 15,000 p.s.i.g. or even higher can be employed.

While the polymerization processes of the applications referred to hereinbefore are effective in polymerizing normally gaseous olefins, especially ethylene and propylene, to normally solid polymers of high molecular weight, we have found that the utilization of the aluminum hydrocarbon co-catalyst poses certain operating problems which are commercially undesirable.

Aluminum hydrocarbon compounds such as aluminum trimethyl, aluminum triethyl and the like are extremely destructive to living tissues and react violently or even explode on contact with water, air or oxygen-containing compounds. Further, the extreme reactivity of these materials with moisture requires that they be handled in an inert atmosphere at all times to preclude reaction with atmospheric moisture and loss of their activity as co-catalysts in the disclosed polymerization processes. The handling of alkyl aluminums presents an ever present fire hazard so that an entire operation wherein flammable hydrocarbons are employed as solvents or reaction media, is maintained in jeopardy as a result of the pyrophoric nature of the aluminum hydrocarbon compound.

We have now found that the processing difficulties encountered in handling aluminum hydrocarbon compounds as polymerization catalysts can be reduced to a minimum by a simple, efficacious and economic expedient. In accordance with our invention, an active catalyst for polymerization of 1-alkenes is prepared by first contacting a 1-alkene in an inert liquid hydrocarbon solvent with a solid supported metal oxide of groups 5a and/or 6a in the presence of a co-catalyst comprising essentially an aluminum hydrocarbon compound as hereinafter defined. Contacting is effected at a temperature in the range between about 20° C. and about 230° C. for from about 15 minutes to about 1 hour sufficient to form from about 0.1 to about 10 pounds of polymer per pound of solid catalyst. The reactor is then vented and the reaction contents cooled. If polymerization is effected above about 120° C., a viscous solution or substantially solid gel containing embedded catalyst is formed. If the polymerization is effected below about 120° C., the polymer will be swollen and popcorn-like in appearance. In both cases the active catalyst is dispersed throughout, embedded in and protected by the polymer coating formed in this initial polymerization stage. The catalyst-polymer agglomerate can be separated if desired, and stored for long periods of time without impairing the efficiency of the encapsulated active catalyst.

The catalyst-polymer agglomerate when so prepared is an effective catalyst for polymerization of additional amounts of 1-alkenes. Portions of the polymer-encapsulated catalyst can be employed for further polymerization of 1-alkenes under the conditions normally employed for such reactions. Preferably the catalyst concentration in the catalyst preparation step is from 1–100, preferably 2–10 times as high, based on the weight of solvent, as that normally employed in such polymerization reactions. The resulting polymer-catalyst agglomerate can then be employed to catalyze from 1–100 additional polymerizations of the size of the catalyst-forming polymerization. Additional quantities of aluminum hydrocarbon, if desired, can be added to the polymerization step in order to obtain a more highly active catalyst. However, this step is not necessary and can be dispensed with where minimum handling of the $AlR_3$ compound is desired.

Our method for providing a polymer-encapsulated polymerization catalyst differs from known techniques for forming polymer-protected catalytic substances in that the protective polymer coating is formed in situ by means of the polymerization activity of the catalyst itself. We have attempted to form active encapsulated catalysts by dissolving polyethylene in a solvent medium having dispersed therein a supported metal oxide. Such mixtures on cooling precipitate a polymer-catalyst agglomerate which in the presence of added aluminum hydrocarbon compound is substantially inactive for olefin polymerization. It appears that the in situ formation of the protective polymer preserves the activity of the encapsulated catalyst and leads to the desirable results herein described.

In the first stage of our polymerization process, i.e. the preparation of a polymer-encapsulated catalyst, polymerization conditions are employed which are broadly the same as those of the second stage, i.e. the polymerization of 1-alkenes using the active polymer-coated catalysts produced in the first stage of the process. Preferably, polymerization is effected in the first stage for a period of time sufficient to form about 0.1 to about 10 parts polymer per part solid catalyst, usually in a period of from about 0.25 hour to about two hours. The polymer encapsulated active catalyst is then separated and used either in toto or in portions for further 1-alkene polymerization.

In the polymerization of normally gaseous 1-alkenes, the proportion of group 5a or 6a metal oxide catalyst (including the catalyst support), with respect to the olefin charging stock, may vary from about 0.001 to about 20 weight percent, being not usually a critical feature of our process. The proportion of $AlR_3$ compound, based on the olefinic charging stock, can be varied within the range of about 0.001 to about 20 weight percent, the precise proportion selected for use being dependent upon the desired rate of polymerization, the concentration of contaminants in the olefinic feedstock which tends to react with or destroy the hydrocarbon aluminum compound, the particular olefin-containing charge stock, temperature and other reaction variables.

It is desirable to supply to the reaction zone a liquid medium which serves both as a transport medium for solid products and as a solvent for the olefin feedstock and organo-metallic co-catalyst. Suitable liquid reaction media for polymerization include various hydrocarbons, e.g., liquid paraffins such as n-heptane or octanes or aromatic hydrocarbons such as benzene, toluene or xylenes. The polymerization can be effected in the absence of a liquid reaction medium or solvent and solid catalyst containing accumulated solid polymers can be treated from time to time, within or outside the conversion zone, to effect removal of polymers therefrom and, if necessary, reactivation or regeneration of the catalyst for further use.

Ethylene and propylene are particularly preferred feedstocks. The olefinic charging stocks may contain inert hydrocarbons, as in refinery gas streams; for example, methane, ethane, propane, etc. The process of the present invention can be employed to effect copolymerization of the terminal vinyl olefin with other polymerizable materials, e.g. propylene, t-butylene, conjugated diolefinic hydrocarbons such as butadiene, isoprene, and the like; styrene; ar-alkyl styrenes; various vinyl compounds such as tetrafluoroethylene, perfluorovinyl chloride and the like. When comonomers are employed with the principal charging stock, their proportion may range between about 1 and about 25% by weight, based on the weight of the principal olefin charging stock, such as ethylene, although some comonomers such as butadiene or styrene may be used in proportions up to 95% by weight of the total olefin feedstock.

The oxide catalyst ingredients employed in the present invention are those of metals of group $5a$ or group $6a$ (transition series members) of the periodic table, viz. V, Nb, Ta, Cr, Mo, W, U or mixtures thereof. The metal oxides are preferably extended upon suitable supports and may be pentoxides. The supported group $5a$ or $6a$ oxides are calcined in air at temperatures between about 250° and about 700° C. before use to minimize the concentration of water or hydroxy groups in the catalysts and/or supports. Probably even the chemical structures as well as the physical characteristics of the catalysts are affected by the high temperature calcination.

The group $5a$ or $6a$ oxides can be at least partially pre-reduced before use and preferably before contact with the $AlR_3$ co-catalyst by the use of various reducing agents such as hydrogen, saturated hydrocarbons, CO, $H_2S$ or their equivalents.

The group $5a$ or $6a$ metal oxide can be extended upon suitable supports (having surface areas, for example, between about 1 and about 1500 square meters per gram), for example, difficulty reducible metal oxides such as alumina, magnesia, titania, zirconia, silica or their composites, e.g., synthetic aluminosilicates, clays and the like. In some instances it may be desired to employ a relatively low surface area support, of which a variety are known in the art, including tabular alumina, various fused silicates, silicon carbide, diatomaceous earths; various metals, preferably treated to produce a relatively thin surface coating of the corresponding metal oxide thereon, such as iron or steel containing a slight iron oxide coating or aluminum carrying a surface coating of aluminium oxide, e.g., as an anodized aluminum. We may also employ relatively high surface area, relatively non-porous supports or carriers for the group $5a$ or $6a$ metal oxide such as kaolin, zirconium oxide, iron oxide pigments, carbon black or the like.

The catalyst support may comprise or consist essentially of suitable metal fluorides, particularly the fluorides of alkali metals, alkaline earth metals, Al, Ga, and In. High melting fluorides which are only slightly soluble, at most, in water are preferred. A particularly desirable type of catalyst support comprises or consists essentially of $AlF_3$ and the composite catalyst can then be calcined prior to use.

The relative proportion of support to the catalytic metal oxide is not critical and may be varied throughout a relatively wide range such that each component is present in amounts of at least approximately 1 weight percent. The usual metal oxide to support ratios are in the range of about 1:20 to 1:1, or approximately 1:10. We may employ metal oxide catalysts composed of a supporting material containing about 1 to 80%, preferably about 5 to 35%, or approximately 10% of vanadia or molybdena or other group $5a$ or $6a$ catalytic metal oxide supported thereon.

The group $5a$ or $6a$ metal oxide can be incorporated in the catalyst support in any known manner, for example, by mechanical means as by ball milling, by impregnation, coprecipitation, co-gelling and/or absorption techniques which are well known in the catalyst art. It may be desired to confine the metal oxide almost completely to a surface film on the support, rather than to achieve deep impregnation of the support with metal oxide catalyst, in order to minimize mechanical disintegration of the catalyst by solid polymer.

In order to reduce the requirements of the $AlR_3$ co-catalyst, it is preferable to effect partial reduction of catlysts comprising group $5a$ metal pentoxides or hexavalent group $6a$ metal oxides before use in the polymerization process. The partial reduction and conditioning treatment of the solid metal oxide catalysts is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc. may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation can be varied from sub-atmospheric pressures, for example, even 0.1 pound (absolute), to relatively high pressures up to 3000 p.s.i.g., or even more. The simplest reducing operation can be effected with hydrogen at about atmospheric pressure.

Reducing gases such as carbon monoxide and sulfur dioxide may be used under substantially the same conditions as hydrogen. Dehydrogenatable hydrocarbons are usually employed at temperatures of at least about 450° C. and not above 850° C. Examples of dehydrogenatable hydrocarbons are acetylene, methane and other normally gaseous paraffins, hydrocarbons such as benzene, toluene, xylenes and the like, normally solid polymethylenes, polyethylenes or paraffin waxes, and the like.

The proportion of group $5a$ or $6a$ metal oxide catalyst (including support), based on the weight of the monoolefinic charging stock can range upwardly from about 0.001 weight percent to 20 weight percent or even more. In a polymerization operation carried out with a fixed bed of catalyst, the catalyst concentration relative to olefin can be very much higher. The efficiency of the supported group $5a$ or $6a$ metal oxide catalysts is extremely high in the presence of $AlR_3$ co-catalysts, so that said metal oxide catalysts can be employed in very small proportions, based on the weight of charging stock, for example, between about 0.001 and about 10 weight percent, while maintaining high conversion efficiency.

The $AlR_3$ compounds which can be used in practicing our invention include compounds conforming to the general formula:

wherein $R_1$, $R_2$, and $R_3$ may be the same or different monovalent radicals selected from the class consisting of hydrogen and monovalent hydrocarbon radicals. Examples of suitable R groups include an aryl radical, aliphatic hydrocarbon radical or derivative, such as alkyl, cycloalkyl-alkyl, cycloalkenylalkyl, aryl-alkyl, cycloalkyl, alkylcycloalkyl, aryl-cycloalkyl, cycloalkylalkenyl, alkylaryl or cycloalkyl-aryl radicas. Specific and non-limitative examples of R groups for substitution in the above formula are set out in U.S. Patent 2,824,089.

The proportion of AlR$_3$ co-catalyst, based on the weight of the olefinic charging stock, can range from about 0.001 to 20 weight percent or even more, although it is usually employed in proportions between about 0.001 and about 10 weight percent, e.g., usually about 0.01 to about 5 weight percent.

The olefinic charging stock is polymerized in the presence of a substantially inert liquid reaction medium which functions as a partial solvent for the monomer, which may function as a solvent or partial solvent for the organo-metallic co-catalyst and which also functions as a liquid transport medium to remove normally solid polymerization products as a dispersion in said medium from the polymerization reactor, thus permitting efficient and continuous polymerization operations.

Particularly suitable liquid reaction media are various classes of hydrocarbons or their mixtures which are liquid and substantially inert under the polymerization conditions of the present process. Certain classes of aliphatic hydrocarbons can be employed as a liquid hydrocarbon reaction medium in the present process. Thus we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquified alkanes such as propane, butanes, n-pentane, n-hexane, 2,3-dimethylbutane, n-octane, iso-octane (2,2,4-trimethylpentane), n-decane, n-dodecane, alkane mixtures such as mineral spirits which have been treated with sulfuric acid to remove unsaturated hydrocarbons, cyclohexane, methylcyclohexane, dimethylcyclopentane, ethylcyclohexane, decalin, methyldecalin, dimethyldecalin and the like.

Members of the aromatic hydrocarbons series, particularly the mononuclear aromatic hydrocarbons, viz., benzene, toluene, xylenes, mesitylene and xylene-p-cymene mixtures can also be employed. Tetrahydronaphthalene can also be employed. In addition, we may employ such aromatic hydrocarbons as ethylbenzene, isopropylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methyl-naphthalene, 2-isopropylnaphthalene, 1-n-amylnaphthalene and the like, or commercially produced fractions containing these hydrocarbons.

We may also employ a liquid hydrocarbon reaction medium comprising e.g., n-hexanes, cyclohexenes, octanes, hexadecenes and the like.

The liquid hydrocarbon reaction medium should be freed of poisons before use in the present invention by acid treatment, e.g. with anhydrous p-toluene sulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

In the operation of the present process, the AlR$_3$ co-catalyst can be added to a suspension or slurry of the supported metal oxide catalyst at room temperature, and the olefinic feedstock then immediately added and the reaction mass heated to polymerization temperature. The promoting action of the aluminum hydrocarbon compound can be enhanced if it is prereacted with the solid catalyst prior to admission of the olefin. Prereaction is carried out in the absence of olefin from about 0.5 to 4 hours, preferably about 1 hour at temperatures between room temperature and about 150° C. Temperature control during the course of the polymerization process can be readily accomplished owing to the presence in the reaction zone of a large liquid mass having relatively high heat capacity. The liquid hydrocarbon reaction medium can be cooled by heat exchange inside or outside the reaction zone.

It is desirable to minimize or avoid the introduction of water, oxygen, carbon dioxide, acetylene or sulfur compounds into contact with the catalyst or co-catalyst. Any known means may be employed to purify the olefinic charging stocks of these materials prior to their introduction into the polymerization reactor.

The following specific examples are introduced as illustrations of our invention and should not be interpreted as an undue limitation thereof. The ethylene employed in the polymerization reactions was a commercial product containing less than 50 p.p.m. oxygen. Prior to use in polymerization the solid metal oxide catalysts were calcined in air at temperatures within the range of about 430° C. to 570° C. at atmospheric pressure for periods of time within the range of about 1 to about 20 hours.

EXAMPLE I

A 300 cc. rocking bomb was charged with 70 cc. purified mineral spirits, 0.76 g. aluminum triisobutyl and 1.6 g. of a catalyst comprising 7.5% V$_2$O$_5$ on silica which had been calcined in air for 1 hour at 450° C. The mixture was heated to 150° C., then pressured with ethylene to 1000 p.s.i. The bomb was rocked and the pressure maintained at 800–1000 p.s.i. by incremental addition of ethylene as needed. At the end of two hours, 32 g. of ethylene had been absorbed. The reactor was cooled to 27° C., vented and upon opening a solid firm uniform piston of polymer was removed. This piston of polymer contained all of the hydrocarbon solvent employed.

A 12.5 g. portion of this solid polymer was again charged to the bomb which contained 100 cc. of mineral spirits and 0.76 g. aluminum triisobutyl. The bomb was closed, heated to 150° C. and ethylene pressured in at 800–1000 p.s.i.g. At the end of 1.5 hours, the bomb was cooled and opened. Again the bomb was filled with a solid piston of polymer. This operation produced 18.1 g. of additional polymer. The total amount of polymer produced in both stages amounted to 100 g. polymer/g. solid catalyst. Higher yields could have been obtained except for the fact that the bomb was filled to capacity with solid polymer in each step.

EXAMPLE II

A series of polymerization runs were conducted in which a polymer-catalyst agglomerate was first prepared, stored for varying periods of time, then charged to a polymerization reaction zone to determine the effectiveness of the stored agglomerate as a polymerization catalyst. In each run the solid catalyst was calcined before use, charged to the reactor containing 110 cc. cyclohexane and aluminum alkyl compound added. Polymerization conditions for preparation of the polymer-catalyst agglomerate are given as "first stage" conditions, following which the reactor was vented and the polymer-catalyst agglomerate stored for varying periods of time as indicated in the following table. In the second stage, the polymer containing active catalyst was employed to effect polymerization under indicated "second stage" conditions. The results so obtained are given in the table.

*Table*

| Run number | 1 | 2 | 3 | 4 | 5 | 6 | 7 | 8 |
|---|---|---|---|---|---|---|---|---|
| Catalyst charged: | | | | | | | | |
| 7.5% V$_2$O$_5$-SiO$_2$, g | | | | | | | 0.225 | |
| 4.5% CrO$_3$-SiO$_2$, g | 0.225 | 0.225 | 0.225 | 0.225 | [1] 0.225 | [2] 0.225 | | [3] 0.225 |
| AlR$_3$, g | 0.56 | 0.56 | 0.56 | 0.56 | 0.56 | 0.56 | 0.92 | 0.56 |
| Mole ratio AlR$_3$/V$_2$O$_5$ or CrO$_3$ | 28 | 28 | 28 | 28 | 28 | 28 | 50 | 28 |
| Polymerization cond. stage 1: | | | | | | | | |
| Temp., °C, 25 to | 83 | 30 | 30 | 30 | 83 | 30 | 25 | 71 |
| Press., p.s.i. g. 0 to | 800 | 300 | 300 | 300 | 800 | 300 | 300 | 500 |
| Time, hours | 2 | 0.25 | 0.25 | 0.25 | 2 | 0.25 | 0.25 | 3.0 |
| Solid polymer produced from stage 1, g | 16.1 | 4.9 | 4.9 | 4.9 | 2.1 | 4.9 | 0.8 | 4.5 |
| Olefin vented from stage 1 and polymer-catalyst mixture stored as such before stage 2, hrs | 0 | 1 | 18.5 | 19 | 0 | 0.02 | 17.5 | 0.5 |
| Add. AlR$_3$ charged to stage 2, g | 0 | 0 | 0 | 0.56 | 0 | 0 | 0 | 0.27 |
| Polymerization con. stage 2: | | | | | | | | |
| Temp., °C. 25 to | | 83 | 83 | 83 | | 71 | 102 | 88 |
| Press., p.s.i. g. 0 to | | 800 | 800 | 800 | | 350 | 800 | 800 |
| Time, hours | | 1.75 | 1.75 | 1.75 | | 23 | 1.75 | 2.0 |
| Solid polym. from stages 1 and 2, g | 16.1 | 36.1 | 38.9 | 52.1 | 2.1 | 15.1 | 51.8 | 39.2 |
| G. total solid polym./g. solid cat | 72 | 160 | 173 | 232 | 9 | 67 | 230 | 174 |
| Intrin. visc. of solid polymer | 9 | 25 | 13 | 12 | 9 | 13 | 21 | 8 |

[1] The catalyst-polymer mixture prepared by adding 0.225 g. CrO$_3$-SiO$_2$ to 0.50 g. polyethylene in 250 cc. xylene at 137° C. and then coprecipitating cat. with polym. by cooling to 25° C. This mixture was charged as catalyst source.
[2] Reaction initiated with ethylene as indicated for Stage 1 employing 50 cc. cyclohexane as solvent. Then ethylene was vented, 100 g. propylene charged and converted under the conditions shown for Stage 2.
[3] Reaction initiated with propylene, then propylene vented and ethylene charged to Stage 2.

In run No. 1 of the table, ethylene was polymerized in one stage for a period of two hours resulting in a yield of 16.1 g. polymer. Run No. 2 was effected in two stages, the first stage being the preparation of the polymer-catalyst agglomerate. The separated encapsulated catalyst from stage 1 was recharged to the polymerization reactor after being stored for one hour under ambient conditions, and was a very effective catalyst for production of additional polyethylene. In run No. 3, the period of time for storage of the encapsulated polymer was increased to 18.5 hours without deleterious effect to the catalyst activity. If desired, additional aluminum hydrocarbon can be employed in the second stage together with the encapsulated catalyst to give even higher yields of normally solid polymer as demonstrated by run No. 4.

Run No. 5 shows the results obtained when an attempt was made to form an encapsulated catalyst by dissolving polyethylene in a solvent containing the solid catalyst, then cooling to recover an encapsulated catalyst. The catalyst was essentially inactive for further ethylene polymerization indicating that in situ formation of the encapsulating polymer is essential in our process.

In run No. 6, encapsulation was effected with ethylene in the first stage reaction, and the polymer-catalyst agglomerate then used to polymerize propylene in the second stage. Excellent yields of solid polypropylene substantially insoluble in xylene at room temperature were obtained. Run No. 7 demonstrates the excellent results obtained with our process employing a supported vanadia catalyst.

In run No. 8, propylene (90 g.) was employed without added solvent in the first stage reaction. After 3.0 hours, excess unreacted propylene was removed, 110 cc. cyclohexane added to the polymer-catalyst agglomerate, and ethylene pressured in from the second stage polymerization.

The polymers produced by the process of this invention can be subjected to such after-treatment as may be desired to fit them for particular uses or to impart desired properties. Thus, the polymers can be extruded, mechanically milled, filmed or cast, or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, gas barriers, binders, etc. to even a wider extent than polyethylenes made by prior processes.

The polymers produced by the process of the present invention especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes, such as paraffin or petrolatum waxes, with high molecular weight polybutylenes, and with other organic materials. Small proportions between about 0.1 and about 1 percent of the various polymers produced by the process of the present invention can be dissolved or dispersed in hydrocarbon lubricating oils to increase V.I. and to decrease oil consumption when the compounded oils are employed in motors. The polymerization products having molecular weights of 50,000 or more, provided by the present invention, can be employed in small proportions to substantially increase the viscosity of fluent liquid hydrocarbon oils and as gelling agents for such oils.

The polymers produced by the present process can be subjected to chemical modifying treatments, such as halogenations, halogenation followed by dehalogenation, sulfohalogenation by treatment with sulfuryl chloride or mixtures of chlorine and sulfur dioxide, sulfonation, and other reactions to which hydrocarbons may be subjected. The polymers of our invention can also be irradiated by high energy X-rays (about 0.5 to 2.5 mev. or more) or by radioactive materials to effect cross-linking, increases in softening temperatures, etc.

We claim:
1. A process for producing a normally solid resin which comprises the steps of
   (1) contacting a solution of a normally gaseous 1-alkene in an inert hydrocarbon medium in a first polymerization reaction zone with a heterogeneous catalyst comprising essentially a minor proportion of a metal oxide selected from the class consisting of group 5a and group 6a metal oxides supported upon a major proportion of a solid inert support and a co-catalyst having the formula AlR$_3$ wherein R is a monovalent hydrocarbon radical,
   (2) effecting said contacting under polymerization conditions including a temperature in the range between about 20° C. and about 230° C. for a period of time between about 0.1 and about 2 hours,

(3) separating a solid agglomerate of a normally solid polymer-catalyst concentrate consisting essentially of a solid gel of said inert hydrocarbon medium containing solid polymer and catalyst,
(4) charging said separated polymer-catalyst concentrate to a second polymerization reaction zone and effecting contact thereof under polymerization reaction conditions with a solution of a normally gaseous 1-alkene in an inert hydrocarbon medium for a period of time between about 1 and 24 hours, and
(5) recovering a normally solid resin so produced.

2. The process of claim 1 wherein the polymer-catalyst concentrate contains between about 0.1 and about 10 parts normally solid polymer per part solid catalyst.

3. The process of claim 1 wherein said normally gaseous 1-alkene is ethylene.

4. The process of claim 1 wherein ethylene is charged to said first polymerization zone and propylene is charged to said second polymerization zone.

5. The process of claim 1 wherein propylene is charged to said first polymerization zone and propylene is charged to said second polymerization zone.

6. A process for producing a normally solid polymer of ethylene which comprises the steps of
   (1) contacting a solution of ethylene in an inert hydrocarbon medium in a first polymerization reaction zone with a catalyst comprising essentially a minor proportion of chromium oxide supported upon a major proportion of a solid inert support and a co-catalyst comprising a trialkyl aluminum,
   (2) effecting said contacting under polymerization conditions including a temperature in the range between 20° C. and about 230° C. for a period between about 0.1 and about 2 hours,
   (3) separating a solid agglomerate of a normally solid polyethylene-catalyst concentrate consisting essentially of a solid gel of said inert hydrocarbon medium containing between about 0.1 and about 10 parts normally solid polyethylene per part solid catalyst,
   (4) charging said separated polyethylene-catalyst concentrate to a second polymerization reaction zone and effecting contact thereof under polymerization reaction conditions with a solution of ethylene in an inert hydrocarbon medium for a period of time between about 1 and 24 hours, and
   (5) recovering a normally solid polyethylene so produced.

7. Process of claim 4 wherein said solid inert support is a difficultly reducible metal oxide.

8. Process of claim 4 wherein a trialkyl aluminum is charged to said second polymerization reaction zone together with said polyethylene-catalyst concentrate.

9. A process for producing a normally solid polymer of ethylene which comprises the steps of
   (1) contacting a solution of ethylene in an inert hydrocarbon medium in a first polymerization reaction zone with a catalyst comprising essentially a minor proportion of vanadium oxide supported upon a major proportion of a solid inert support and a co-catalyst comprising a trialkyl aluminum,
   (2) effecting said contacting under polymerization conditions including a temperature in the range between 20° C. and about 230° C. for a period between about 0.1 and about 2 hours,
   (3) separating a solid agglomerate of a normally solid polyethylene-catalyst concentrate consisting essentially of a solid gel of said inert hydrocarbon medium containing between about 0.1 and about 10 parts normally solid polyethylene per part solid catalyst,
   (4) charging said separated polyethylene-catalyst concentrate to a second polymerization reaction zone and effecting contact thereof under polymerization reaction conditions with a solution of ethylene in an inert hydrocarbon medium for a period of time between about 1 and 24 hours, and
   (5) recovering a normally solid polyethylene so produced.

References Cited in the file of this patent

UNITED STATES PATENTS

| | | |
|---|---|---|
| 2,824,089 | Peters | Feb. 18, 1958 |
| 2,886,561 | Reynolds et al. | May 12, 1959 |
| 2,889,314 | Fritz | June 2, 1959 |
| 2,908,669 | Hagemeyer et al. | Oct. 13, 1959 |
| 2,984,653 | Witt | May 16, 1961 |

FOREIGN PATENTS

| | | |
|---|---|---|
| 533,362 | Belgium | May 16, 1955 |
| 549,804 | Belgium | July 25, 1956 |
| 1,136,710 | France | Dec. 29, 1956 |
| 1,149,532 | France | July 15, 1957 |
| 791,889 | Great Britain | Mar. 12, 1958 |

UNITED STATES PATENT OFFICE
CERTIFICATE OF CORRECTION

Patent No. 3,082,195            March 19, 1963

Edwin F. Peters et al.

It is hereby certified that error appears in the above numbered patent requiring correction and that the said Letters Patent should read as corrected below.

Column 8, line 36, after "waxes," insert -- with ester waxes, --.

Signed and sealed this 8th day of October 1963.

(SEAL)
Attest:

ERNEST W. SWIDER
Attesting Officer

EDWIN L. REYNOLDS
Acting Commissioner of Patents